US 8,321,438 B1

(12) United States Patent
Smith et al.

(10) Patent No.: US 8,321,438 B1
(45) Date of Patent: Nov. 27, 2012

(54) INTEGRATION LAYER FOR A DATA REPOSITORY

(75) Inventors: Barry Lanell Smith, Waxhaw, NC (US); Mark Walters, Charlotte, NC (US); Hans D. Schumacher, Matthews, NC (US); Mari Anne Kawaguchi, San Francisco, CA (US); Daniel D. Grace, Waxhaw, NC (US); W. Keith Gordon, Denver, NC (US); Matthew Allen Knight, Charlotte, NC (US); Chris Keilitz, Norfolk, VA (US)

(73) Assignee: Bank of America Corporation, Charlotte, NC (US)

( * ) Notice: Subject to any disclaimer, the term of this patent is extended or adjusted under 35 U.S.C. 154(b) by 444 days.

(21) Appl. No.: 12/141,283

(22) Filed: Jun. 18, 2008

(51) Int. Cl.
*G06F 17/30* (2006.01)

(52) U.S. Cl. ......... 707/758; 707/809; 715/236; 717/136

(58) Field of Classification Search .......... 1/1; 707/756, 707/809; 717/100, 136; 715/236
See application file for complete search history.

(56) References Cited

U.S. PATENT DOCUMENTS

| | | | |
|---|---|---|---|
| 6,449,695 B1 * | 9/2002 | Bereznyi et al. | 711/134 |
| 7,822,710 B1 * | 10/2010 | Miller et al. | 707/620 |
| 2002/0194220 A1 * | 12/2002 | Sluiman | 707/513 |
| 2003/0018616 A1 * | 1/2003 | Wilbanks et al. | 707/2 |
| 2003/0208458 A1 * | 11/2003 | Dettinger et al. | 707/1 |
| 2003/0208486 A1 * | 11/2003 | Dettinger et al. | 707/6 |
| 2004/0107212 A1 * | 6/2004 | Friedrich et al. | 707/104.1 |
| 2004/0186842 A1 * | 9/2004 | Wesemann | 707/100 |
| 2004/0230328 A1 * | 11/2004 | Armstrong et al. | 700/83 |
| 2005/0149536 A1 * | 7/2005 | Wildes et al. | 707/100 |
| 2005/0278353 A1 * | 12/2005 | Norgaard et al. | 707/100 |
| 2006/0101423 A1 * | 5/2006 | Aharoni et al. | 717/136 |
| 2006/0190501 A1 * | 8/2006 | Massironi | 707/203 |
| 2007/0033567 A1 * | 2/2007 | Carlson et al. | 717/100 |
| 2007/0179939 A1 * | 8/2007 | O'Neil et al. | 707/4 |
| 2007/0276787 A1 * | 11/2007 | Piedmonte | 707/2 |
| 2008/0027899 A1 * | 1/2008 | Khunteta et al. | 707/2 |
| 2008/0046414 A1 * | 2/2008 | Haub et al. | 707/3 |
| 2008/0140693 A1 * | 6/2008 | Hao et al. | 707/102 |
| 2008/0215532 A1 * | 9/2008 | Arnold et al. | 707/2 |
| 2008/0234987 A1 * | 9/2008 | Haley | 703/1 |

* cited by examiner

*Primary Examiner* — Dennis Truong
(74) *Attorney, Agent, or Firm* — Banner & Witcoff, Ltd; Michael A. Springs (57) ABSTRACT

Techniques for a data repository, e.g., a data warehouse, connect multiple disparate systems and combine different software tools to provide a full view of the data warehouse for an end user. An inventory tool integration and services interface includes a tool integration component, a common data component, and an inventory services component. The tool integration component obtains data sets from different tools. The common data component converts each data set and combines the converted data sets. The inventory services component provides the combined data sets through a user interface for an end user. The inventory tool integration and services interface appropriately combines data sets and supports different user interfaces for different end users having different roles within an enterprise. The tool and services integration interface also may obtain a data set from a tool in accordance with an integration option.

26 Claims, 7 Drawing Sheets

INTEGRATION LAYER FOR A DATA REPOSITORY

FIELD

Aspects of the invention generally relate to supporting a main data repository (e.g., data warehouse) for an organization's data.

BACKGROUND

In order to store historical data, a business (enterprise) spanning different business units may maintain an enterprise data warehouse. The data warehouse is typically a large strategic data repository and reporting system that is critical to the enterprise and that supports different organizations within the business a view of data across different business units. A data warehouse typically connects multiple disparate systems without an end-to-end view. e.g., a line-of-business or a portfolio view. Costly customization of vendor tools may be required for end-to-end usage. An analytical tool set within a data warehouse environment is often crowded and overly complex, where the tools satisfy individual requirements for data warehouse management. However, it is the conglomeration of these tools into a central operating environment that is often lacking.

The data warehouse typically accesses numerous data sources through different tools for different end users, where an end user is associated with a role within the enterprise. However, an end user is typically required to interact with different tools, necessitating that the end user be knowledgeable about each tool. Moreover, if a tool is replaced by a corresponding tool of a different vendor or if a tool is added to the collection of supported tools, the end user often needs to be trained to use the new tool.

BRIEF SUMMARY

The present disclosure addresses one or more of the issues mentioned above by disclosing methods, computer readable media, and apparatuses for a data warehouse that combines different software tools and connects multiple disparate systems to provide a full view of the data warehouse for an end user.

With another aspect of the invention, inventory tool integration and services interface (integration layer) includes a tool integration component, a common data component, and an inventory services component. The tool integration component obtains data sets from different tools. The common data component converts each data set and combines the converted data sets. Data sets may be linked in accordance with a common data model and the data sets may be merged. The inventory services components provides the combined data sets to a user interface for an end user. The inventory tool integration and services interface appropriately combines data sets and supports different user interfaces for different end users having different roles within an enterprise.

With another aspect of the invention, the tool integration and services integration interface obtains a data set from a tool in accordance with an integration option. Integration options may include an application programming interface (API), extensible markup language (XML), and web services.

With another aspect of the invention, data sources for the data warehouse may be consolidated. Duplicity of data that is stored in the data sources is reduced. In addition, data may be removed when the data is not accessed for a predetermined period of time.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the invention, methods, computer-readable media, and apparatuses are disclosed in which a data warehouse combines different software tools (tools) and connects multiple disparate systems to provide a full view of the data warehouse for an end user.

Figure 1:
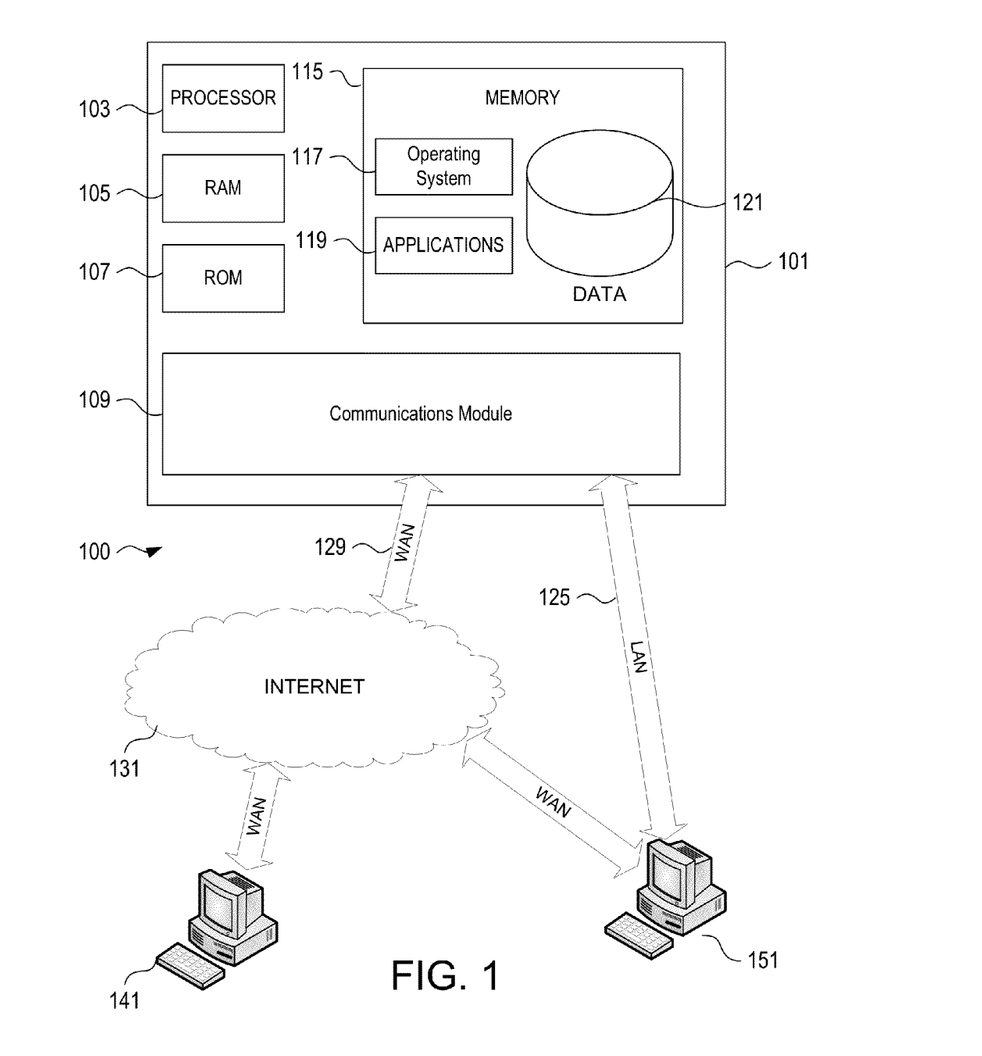
FIG. 1 shows an illustrative operating environment in which various aspects of the invention may be implemented.
Figure 5:
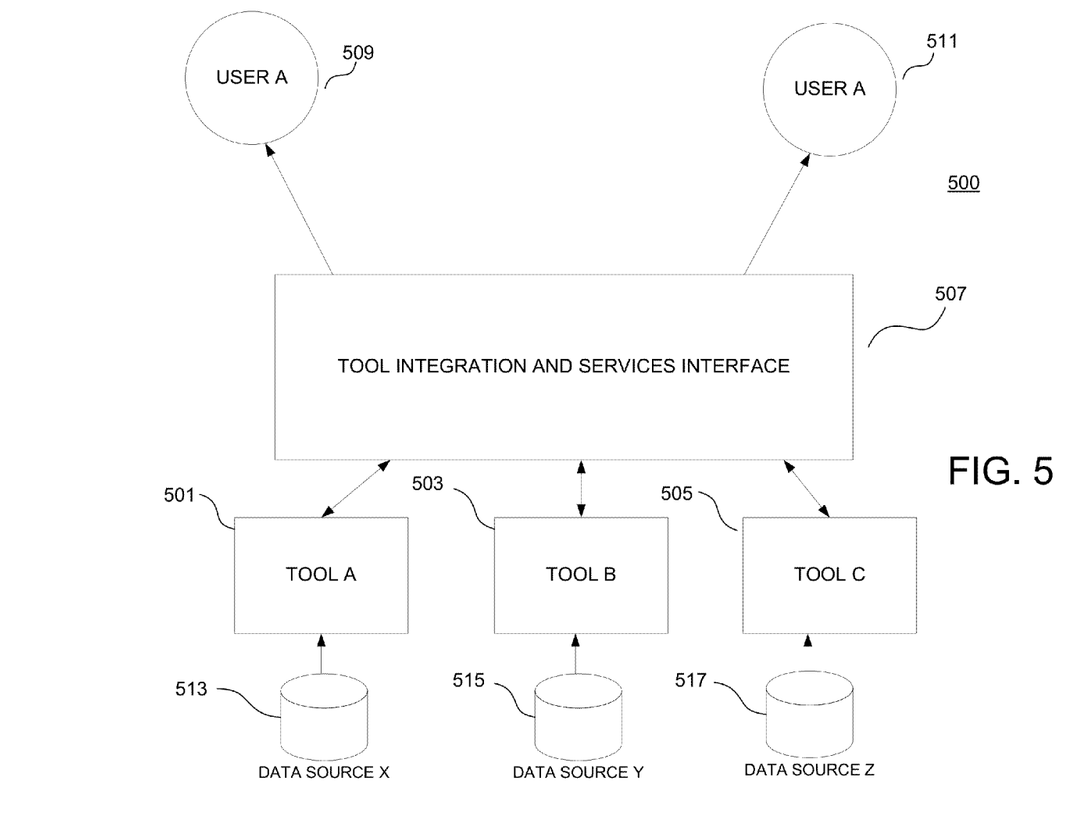
FIG. 5 shows a data warehouse system in accordance with an aspect of the invention.

FIG. 1 illustrates an example of a suitable computing system environment 100 (e.g., data warehouse system 500 as shown in FIG. 5) that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise and combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of pre-clearance information or trading information for security equities in different jurisdictions.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
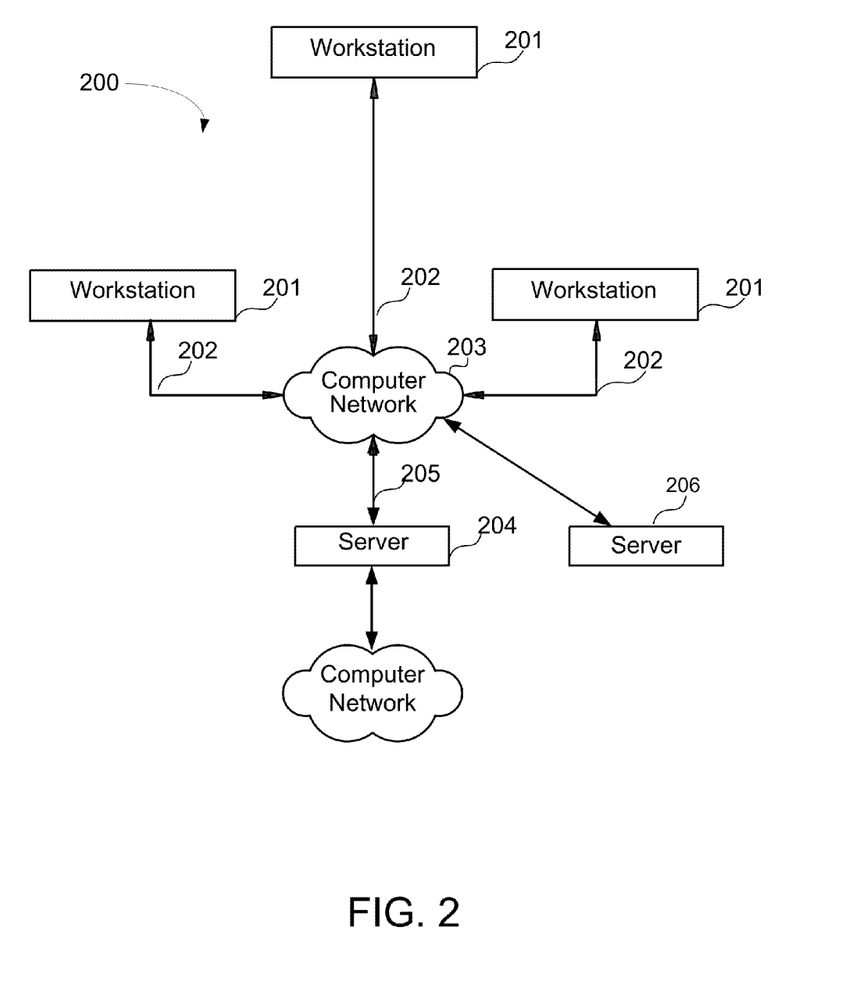
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

System 200 may include a mainframe computer (not shown) and/or a plurality of servers (e.g., server 204 and server 206), where each server may provide different services to a user.

As understood by those skilled in the art, the steps that follow in the Figures may be implemented by one or more of the components in FIGS. 1 and 2 and/or other components, including other computing devices.

With an aspect of the invention, systems 100 or 200 may support a data warehouse, which may be described as a computing system that is used to store information regarding an organization's activities in a database designed specifically for the purpose of analyzing that information to gain strategic information or strategic reporting. Enterprise data warehouses are often critical, strategic data repository and reporting systems that strive to provide organizations with a single, complete view of data across different business units and information technology (IT) systems enabling better-informed, faster business decisions while managing growth and stability.

A data warehouse is a repository of an organization's electronically stored data (e.g., an organization's historical data) and is designed to facilitate reporting and analysis. Also, the means to retrieve and analyze data, to extract, transform and load data, and to manage dictionary data may be considered components of a data warehousing system. Consequently, a definition for data warehousing may be expanded to include business intelligence tools, tools to extract, transform, and load data into the repository, and tools to manage and retrieve metadata.

A data warehouse is typically used for collective processing. Computing in a data warehouse is often referred to as on-line analytical processing (OLAP), contrasting it to on-line transaction processing (OLTP) used for normal business activities. Data from enterprise resource planning (ERP) systems and other related business software systems may be periodically imported into the data warehouses for further processing.

Figure 3:
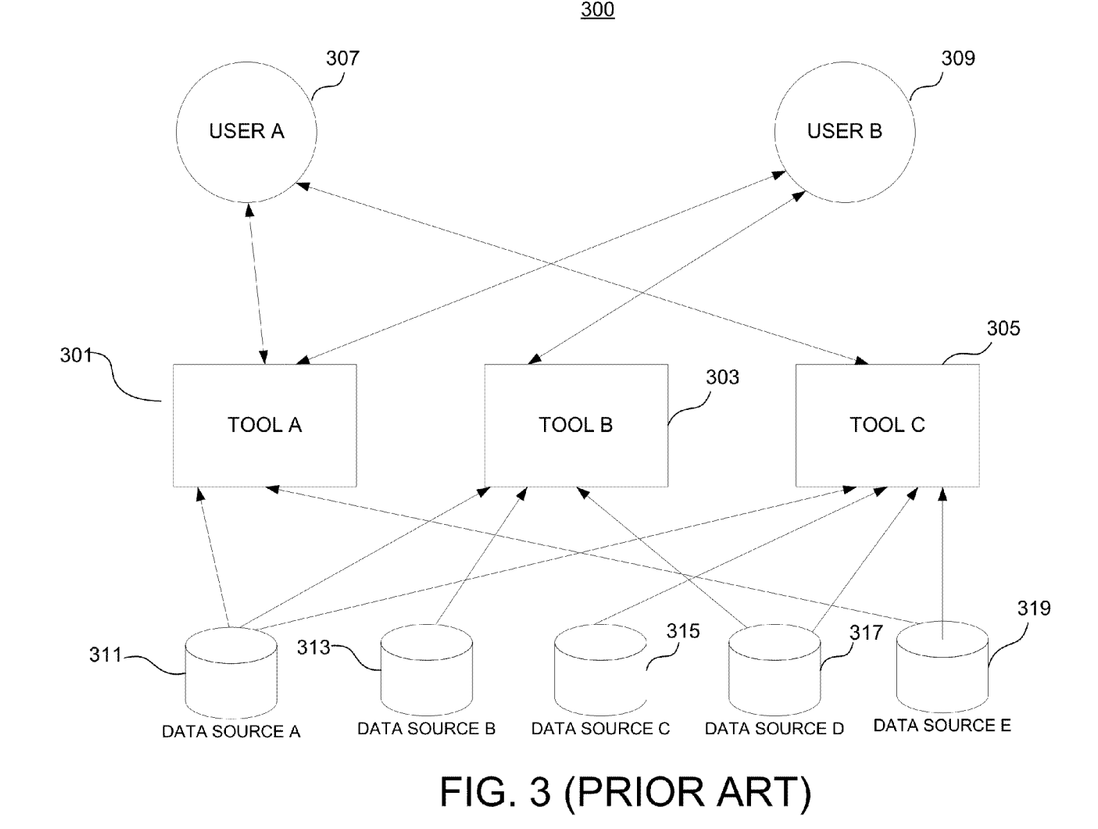
FIG. 3 shows a data warehouse system according to prior art.

FIG. 3 shows data warehouse system 300 according to prior art. End users 307 and 309 can access data sources 311, 313, 315, 317, and 319 by directly interfacing tools 301, 303, and 305. While different tools are available to manage and operate aspects of the data warehouse, the different tools provide specific functionality and may not integrate or work together directly "out of the box." Not having the ability to integrate the different tools and functionality may result in a lack of comprehensive end-to-end management, resulting in the operation of a data warehouse environment being complex, time-intensive and expensive.

With data system 300, the end user directly interfaces with one or more tools 301, 303, and 305. For example, end user 307 interacts with tool 301 to obtain data from data sources 311 and 319 and with tool 305 to obtain data from data sources 311, 315, 317, and 319. Consequently, end user 307 is often required to be knowledgeable about specific commands for tools 301 and 305. If a tool is replaced with another product, a different command set may be used, thus requiring the end user to be retrained for the new tool. Also, if the end user wishes to access data from a different data source, the end user may need to interface to an additional tool. For example, if end user 307 wishes to access data from data source 313, end user 307 needs to utilize tool 303.

Figure 4:
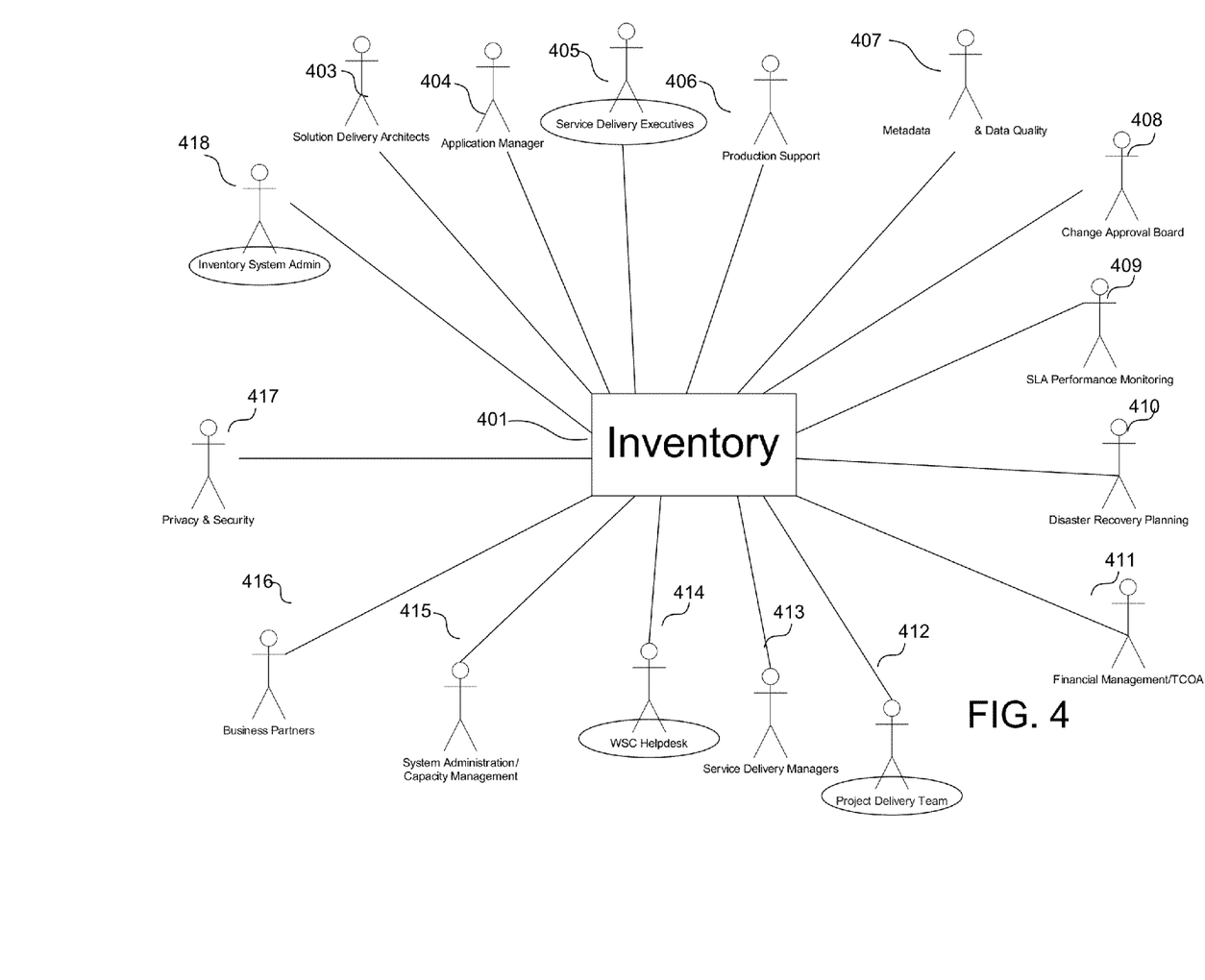
FIG. 4 shows an integration hub for providing services for data extraction in accordance with an aspect of the invention.

FIG. 4 shows integration hub 401 for providing services to end users 403-418 for data extraction in accordance with an aspect of the invention. With an embodiment, end users 403-418 are categorized into end user groups as follow:

Solution delivery architects 403: Research to optimize information architecture

Application manager 404: Performance/SLA tracking of applications and data updates monitoring Service delivery architects 405: Dashboard reports for management oversight showing platform performance, growth and stability Production support 406: find application owners and escalation contacts Metadata and data quality 407: Audit the end-to-end data lineage between systems, jobs and attributes. Verify that metadata has been entered for all DB tables. Run exception reports.

Change approval board 408: Enforce updates resulting from deployments to all platforms. Run reports & online inquiry.

Performance monitoring 409: Obtain exception reports for systems not complying with a service level agreement (SLA) on a proactive basis, receive trending charts.

Disaster recovery planning 410: Query for systems that drive disaster recovery (DR) and backup/recovery.

Financial management 411: Obtain usage of CPU & disk across platforms by user or by hierarchy Project delivery team 412: Primary group to apply Inventory updates. Synchronize inventory and metadata for systems/projects.

Service delivery managers 413: Primary group to apply SLA updates. Obtain reports/charts on actuals vs. goals by business partner. Understand who is using the warehouse data.

Helpdesk 414: Primary group for user profiles input. Query for data stewards, escalation path, basic information on all systems, show integrated systems/jobs/data lineage along with metadata.

System administration/capacity management 415: View growth trend reports/charts, assess against forecasts by system. May export data to a spreadsheet.

Business partners 416: View data load completion, recons status (dollars and record counts), CPU and disk usage for a corresponding line-of-business and SLA compliance. Self service on what systems/tables are available on the data warehouse.

Privacy and security 417: Maintain a list of attributes subject to restrictions (legal, regulatory, contractual). Identify unusual patterns for suspect users. Report on restricted attribute access by a given user. Report users and tables/views by access role.

Inventory system administrator 418: Grant user access for specific functionality in inventory. Perform adhoc updates for product/general ledger (GL) hierarchy/associate changes. Train and support inventory users. Perform system maintenance.

Inventory hub 401 is able to support different end users by providing data from different data sources that are needed to support the role of each group of end users.

FIG. 5 shows data warehouse system 500 that can support the integration hub architecture as shown in FIG. 4 in accordance with an aspect of the invention. Data storage system 500 may access data from a plurality of data sources 513, 515, and 517 through tool integration and services interface (integration layer) 507 for a plurality of end users 509 and 511.

Tools 501, 503, and 505 may be selected as the "best of breed" tools and are situated at the bottom layer interfacing with the data warehouse. Individual end-users 509 and 511 are situated at the top layer making the requests for reports, views, metrics, and the like. Tool integration and services interface 507 is situated between the top and bottom layers combining the functionality of multiple tool sets. End user 509 or 511 perceives that only a single tool is being utilized rather than many tools that tool integration and services interface 507 is actually interacting with.

Tool integration and services interface 507 leverages and combines different and separate vendor products and tools 501, 503, and 505. While FIG. 5 explicitly shows only three tools, embodiments can support a different number of tools. Tool integration and services interface 507 allows the creation of a holistic end-to-end data warehouse management solution that provides profile-driven views of the business, operation of the data warehouse, and transparency across the vendor products.

Tool integration and services interface 507 provides the ability to combine all vendor products together and connects multiple disparate systems that make up the full view of the data warehouse. Tool integration and services interface 507 pulls data from multiple data sources (e.g., data sources 513, 515, and 517) into one inventory view (in accordance with integration hub 401). Typically, an off-the-shelf vendor solution does not meet all of the requirements of a data warehouse and does not correlate information in a user defined context such as a line of business view or a portfolio view. Consequently, considerable customization of these existing vendor tools may be required.

The analytical tool set within a data warehouse environment is often crowded and overly complex. Tools 501, 503, and 505 satisfy individual requirements for data warehouse management. Tool integration and services interface 507 conglomerates tools 501, 503, and 505 into a central operating environment that is typically lacking with prior art.

With an aspect of the invention, tools 501, 503, and 505 are grouped by different functionalities, including:
  Data Profiling/Data Quality: Describes the completeness, validity, consistency, timeliness and accuracy that assure that data and information is appropriate for a specific use.
  Reporting: Technologies: Provides the access layer for viewing information about the system. These technologies provide the user with a consistent way to present information that can be consumed and understood for each end-user type.
  System Performance: Measures system performance. The overall health of the data warehouse infrastructure environment is important to providing superior service. System performance includes several key parameters for the system including CPU utilization, disk I/O, memory usage, parallel efficiency, user and job ID, and the like.
  Extract, Transform, and Load: The process for data extraction and transformation of data and loading processes. Provides audit of data lineage from source to target entity definitions. These processes document the transport of information and business rules and transformation that condition data for provisioning into data base structures.
  Capacity Management: A collection of activities to optimize performance and efficiency of the system. This includes the ability to plan for and justify financial investments. Capacity management is concerned with load on servers or environment in order to understand the demands on the service and future plans for workload growth (or shrinkage).
  Metadata Management: Metadata is data about data. Metadata may also include information about the usage patterns of particular data structures and elements. The information provides key insight into how information is being used, by whom and at what periods. Examples include data element definitions, data element domain of values, and data element business rules.
  Service Level Management (SLM): A formal negotiated agreement between two parties. It is a contract that exists between a customer and a service provider or between service providers. A service level agreement (SLA) records the common understanding about services, priorities, responsibilities, guarantee, and the like with the main purpose to agree on the level of service. The agreement includes specifics around delivery of services, data retention, customer support responsiveness and problem resolution as well as disaster recovery.

When evaluating the specifications of data warehouse 500, one should consider the following:
  Identify all data systems (data sources) and major data attributes that are supplied to data warehouse 500
  Identify all users (and user hierarchies), across the enterprise. Document how the data is used by the end users. Conversely, identify all (regardless of origin) databases, tables and major data attributes that are used by the end user within the hierarchies.
  For data systems providing data to the data warehouse, the following factors should be considered:
  Determine a percentage of completeness
  Determine if the same data is sourced multiple times
  Determine if the data exists on multiple databases, tables (redundancy)
  Determine if there is a reconcilement process and where data reconciles to
  Determine if the data is manipulated or altered from its original state. If so, where does this happen
  How frequently is the data updated
  Is historical data stored in the system With an aspect of the invention, data sources 513-517 are consolidated so that a data source interacts with only one tool (e.g., data source 515 and tool 503) rather than a data source interacting with a plurality data sources (e.g., data source interacting with tools 301 and 303 as shown in FIG. 3). Data sources 513-517 may be consolidated so that the content of a plurality of data sources is contained at a single data source. Also, duplicity of data from a plurality of data sources may be reduced or even eliminated.

System 500 assists in identifying situations in which the same data replicated across the data warehouse. With an embodiment, approximately 20%-25% of the data may be duplicated without data consolidation in data sources 513, 515, and 517. Also, system 500 analyzes usage patterns to assist in understanding the usage patterns including the amount of information history that is accessed, enabling the reduction of on-line storage of data and the cost to business partners (in some embodiments providing a 30% to 35% reduction). System 500 also assists in understanding the entities and attributes that are accessed. When entities and attributes are not accessed for at least a predetermined time duration, the corresponding information can be removed from the data sources 513, 515, and 517 (in some embodiments providing approximately 20% to 25% reduction).

Because the date warehouse environment within a company is often very complex, the operating risks and costs may be dramatically increased. The impact of this inefficiency affects critical quality metrics such as speed, costs and risks and the inability to accurately measure. By reducing complexity and elimination of duplicate systems of record (i.e., individual areas maintaining their own data warehouses) the company may benefit from substantial productivity savings.

Data warehouse 500 may also support a distributed computer architecture having a plurality of data servers and/or mainframe computer so that different metrics may be supported for the different architectures.

Figure 6:
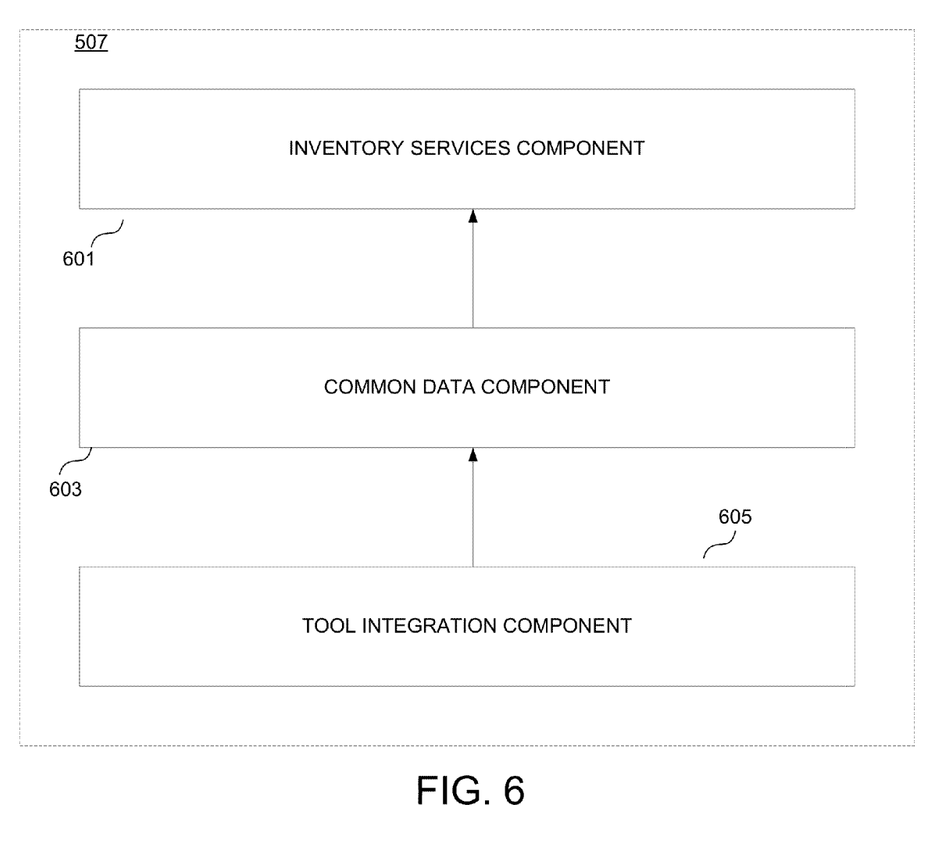
FIG. 6 shows a tool integration and services layer in accordance with an aspect of the invention.

FIG. 6 shows tool integration and services interface 507 in accordance with an aspect of the invention. Tool integration and services interface (integration layer) 507 may integrate disparate vendor packages to create a holistic data warehouse inventory management system. In addition to providing information asset services, system lineage and dependencies, and data consumption, tool integration and services interface 507 may provide end-to-end profile-driven views of the business and operations of the data warehouse and transparency across the vendor products.

In addition, the integration hub (e.g. 401 as supported by tool integration and services interface 507) may include business logic and allow for services for data extraction.

Tool integration and services interface 507 may support a business organization that manages a data warehouse that has multiple disparate data sources feeding its data store with heterogeneous systems where information flow needs to be understood end to end and where best of breed products are used.

Tool integration and services interface 507 includes tool integration component 605, common data component 603, and inventory services component 601. Tool integration component 605 obtains data (data sets) from tools 501, 503, and 505 and presents the data to common data component 603. Each data set is obtained from a corresponding tool. In the disclosure herein, a data set pertains to a collection of data provided by a tool.

Figure 7:
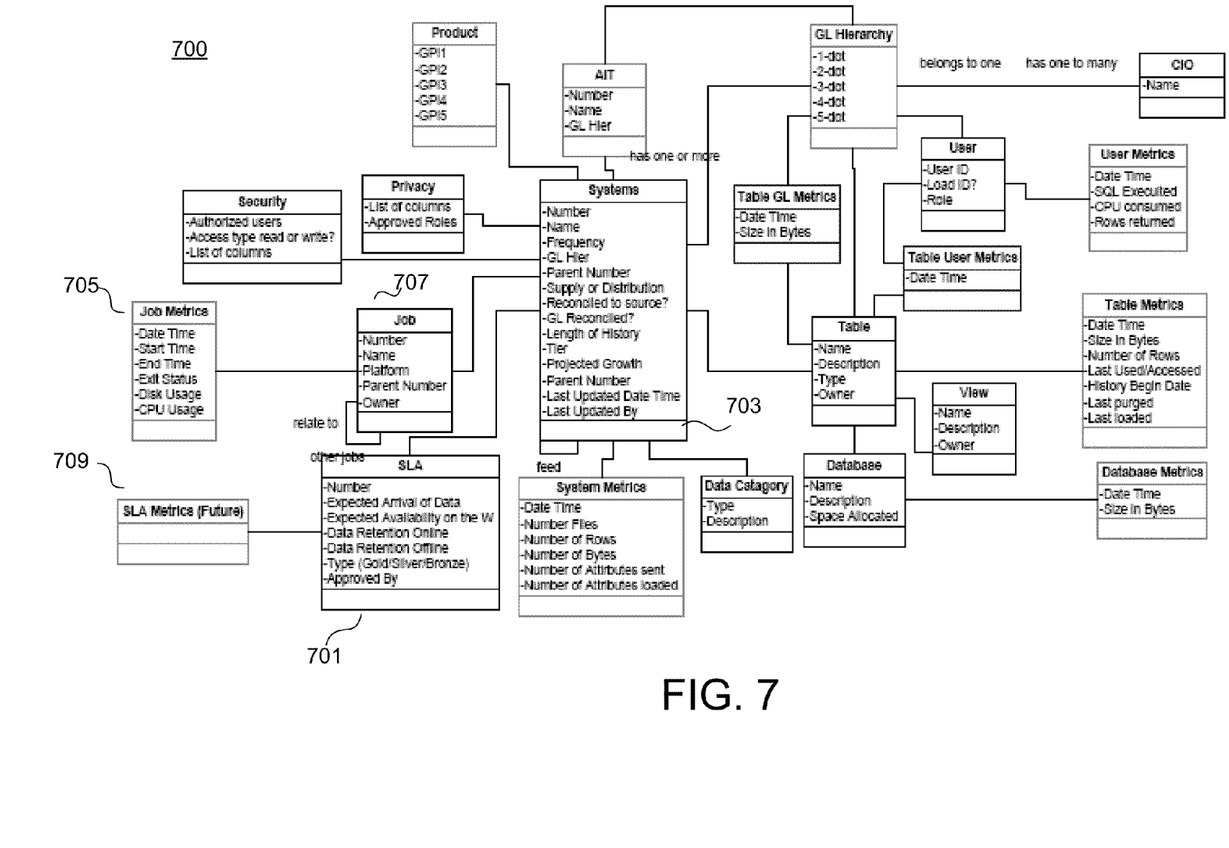
FIG. 7 shows an inventory management domain model in accordance with an aspect of the invention.

Consequently, common data component 603 converts each data set in accordance with common data model (e.g., data model 700) and combines one or more data sets for each end user (e.g., end user 509 and end user 511). Normalization of redundant data and relational referencing are fundamental characteristics of the common data model. Application/system information includes key elements used across the data warehouse environment. That information can be combined or normalized into a single table utilized across the system.

Because different end users may have different rules, the corresponding combined data sets may be different for the different end users. The combined data sets are presented to inventory services component 601. Inventory services component 601 includes combined data sets in a user interface to provide a tailored user format and interaction for a specific end user. Different end users may be provided with different combined data sets in the corresponding user interface to support the corresponding role of the end user.

The inventory services component 601 can provide common services, or Application Programming Interfaces, that are consumable by the tool clients, end users. These interfaces can be the primary mechanism to populate the data model 700 and provide the end user with inventory management data and information. For example, an end user Extract, Transform, and Load (ETL) tool may need application/system information. It can call the inventory services component to "get" application/system information residing in the shared data model.

Tool integration component 605 may interact with tools 501, 503, and 505 using different integration options to obtain data, including an application programming interface (API), extensible markup language (XML), and web services.

The integration of multiple component types (e.g., API, XML, etc. . . . ) can be a dynamic action of the layer itself as these are tool specific integration methods that typically do not change. Therefore, these components types can be built into the layer and the interface needed can be leveraged as required.

An application programming interface is typically a source code interface that an operating system, library or service provides to support requests made by computer programs. An extensible markup language is a general-purpose specification for creating custom markup languages and enables end users to define their own elements. One purpose of the API is to facilitate the sharing of structured data across between tools 501, 503, and 505 and tool integration and services interface 507. XML may be used both to encode documents and to serialize data. A web service may be defined as a software system designed to support interoperable machine to machine interaction over a network. Web services can be accessed by integration tool and services interface 507 from tools 501, 503, and 505.

FIG. 7 shows inventory management domain model 700 in accordance with an aspect of the invention. Common data component 603 (as shown in FIG. 6) obtains data sets from tools 501, 503, and 505 through tool integration component 605 and converts the data in accordance with domain model 700. While inventory management domain model 700 is directed to data related to the service level of data warehouse system 500 and obtained from a tool supporting service level management, domain model 700 may be expanded to specify data sets from other tools (e.g., data profiling/data quality, reporting, system performance, capacity management, and metadata management).

The domain model is extendable as the business need requires. Tools can be plugged into and out of the framework to support business and technology direction assuming standard interface compatibility.

As illustrated in FIG. 7, domain model 700 specifies the data content for each data element. For example, job element 707 (which pertains to a specific job) includes the job number and name, the platform which is executing the job, the parent number of the parent job (if a parent job exists), and the owner of the job (e.g., different data elements are related to each other. For example, job data element 707 is related to job metrics data element 705 and to systems data element 703, and SLA data element 701 is related to SLA metrics data element 709 and systems data element 703.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. An apparatus comprising:
   at least one processor; and
   at least one memory including computer program code, the at least one memory and the computer program code configured to, with the at least one processor, cause the apparatus at least to:
   obtain a plurality of data sets from a plurality of software tools, wherein each data set corresponds to a corresponding software tool;
   convert each said data set to form a converted data set according to a common data model;
   combine a first subset of a plurality of converted data sets to form a first combined data set and a second subset of the plurality of converted data sets to form a second combined data set, the first subset including at least one converted data set different from the second subset, at least one combined data set containing content from at least two of the plurality of converted data sets, wherein the first subset and the second subset of the plurality of converted data sets are converted in accordance with the common data model; and
   include the first combined data set in a first user interface for a first end user and include the second combined data set in a second interface for a second end user.

2. The apparatus of claim 1, wherein the at least one memory and the computer program code are further configured to obtain a first data set of the plurality of data sets, from a first software tool in accordance with a first integration option, the first integration option being selected from a plurality of integration options.

3. The apparatus of claim 2, wherein the at least one memory and computer program code are further configured to obtain a second data set, from the plurality of data sets, from a second software tool in accordance with a second integration option of the plurality of integration options and wherein the second integration option is different from the first integration option.

4. The apparatus of claim 1, wherein:
a first data source provides a first source data set to a first software tool; and
a second data source provides a second source data set to a second software tool, wherein the first source data set and the second source data set are disjoint.

5. The apparatus of claim 1, wherein the at least one memory and the computer program code are further configured to:
link a first data set of the plurality of data sets with a second data set of the plurality of data sets; and
merge the first data set and the second data set to form the first combined data set.

6. The apparatus of claim 1, wherein the apparatus supports a data warehouse.

7. A computer-assisted method comprising:
obtaining a plurality of data sets from a plurality of software tools, the plurality of data sets including at least a first data set and a second data set, wherein each data set is associated with a corresponding software tool;
converting each said data set to form a converted data set according to a common data model;
combining a first subset of a plurality of converted data sets to form a first combined data set and a second subset of the plurality of converted data sets to form a second combined data set, the first subset including at least one converted data set different from the second subset, at least one combined data set containing content from at least two of the plurality of converted data sets, wherein the first subset and the second subset of the plurality of converted data sets are converted in accordance with the common data model; and
including the first combined data set in a first user interface for a first end user and including the second combined data set in a second interface for a second end user.

8. The method of claim 7, further comprising:
selecting a first integration option from a plurality of integration options; and
obtaining the first data set from a first software tool in accordance with the first integration option.

9. The method of claim 8, further comprising:
obtaining the second data set from a second software tool in accordance with a second integration option, wherein the second integration option is different from the first integration option.

10. The method of claim 8, wherein the plurality of integrated options include at least two of an application programming interface (API), an Extensible Markup Language (XML) specification, and a web service.

11. The method of claim 7, further comprising:
providing a first source data set to a first software tool from a first data source; and
providing a second source data set to a second software tool from a second data source, wherein the first data set and the second data set are disjoint.

12. The method of claim 8 further comprising:
replacing the first software tool with another software tool;
obtaining the first data set from the other software tool in accordance with a different integration option.

13. The method of claim 11, further comprising:
consolidating a plurality of data sources into the first data source.

14. The method of claim 13, further comprising:
identifying data in one of the first data set and the second data set that is duplicative of data in the other of the first data set or the second data set and deleting the duplicative data from one of the first data set or the second data set.

15. The method of claim 11, further comprising:
deleting data that is not accessed for at least a predetermined time duration.

16. The method of claim 7, further comprising:
determining a cost for a transaction for the first end user.

17. The method of claim 7, wherein the combining comprises:
linking the first data set with the second data set; and
merging the first data set and second data set to form the first combined data set.

18. A non-transitory computer-readable storage medium storing computer-executable instructions that, when executed, cause a processor to:
obtain a plurality of data sets from a plurality of software tools, wherein each data set corresponds to a corresponding software tool;
convert each said data set to form a converted data set according to a common data model;
combine a first subset of a plurality of converted data sets to form a first combined data set and a second subset of the plurality of converted data sets to form a second combined data set, the first subset including at least one converted data set different from the second subset, at least one combined data set containing content from at least two of the plurality of converted data sets, wherein the first subset and the second subset of the plurality of converted data sets are converted in accordance with the common data model; and
include the first combined data set in a first user interface for a first end user and include the second combined data set in a second interface, different from the first interface, for a second end user.

19. The computer-readable storage medium of claim 18, wherein the computer-executable instructions, when executed, cause the processor to:
select a first integration option from a plurality of integration options; and
obtain a first data set of the plurality of data sets from a first software tool in accordance with the first integration option.

20. The computer-readable storage medium of claim 19, wherein the computer-executable instructions, when executed, cause the processor to:

obtain a second data set of the plurality of data sets from a second software tool in accordance with a second integration option, wherein the second integration option is different from the first integration option.

21. The computer-readable storage medium of claim 18, wherein the computer-executable instructions, when executed, cause the processor to:
provide a first data set to a first software tool from a first data source; and
provide a second data set to a second software tool from a second data source, wherein the first data set and the second data set are disjoint.

22. The computer-readable storage medium of claim 19, wherein the computer-executable instructions, when executed, cause the processor to:
replace the first software tool with another software tool;
obtain the first data set from the other software tool in accordance with a different integration option.

23. The computer-readable storage medium of claim 18, wherein the computer-executable instructions, when executed, cause the processor to:
determine a cost for a transaction for the first end user.

24. The computer-readable storage medium of claim 18, wherein the combining comprises:
linking a first data set with a second data set; and
merging the data sets to form the first combined data set.

25. The apparatus of claim 1, wherein the at least one memory and the computer program code are further configured to combine the first combined data set and the second combined data set differently based on different rules for the first end user and the second end user.

26. The method of claim 7, wherein the first data set is associated with a first software tool and the second data set is associated with a second software tool different from the first software tool.

* * * * *